(12) United States Patent
Dutta et al.

(10) Patent No.: US 10,511,644 B2
(45) Date of Patent: *Dec. 17, 2019

(54) JOINING EXECUTABLE COMPONENT TO ONLINE CONFERENCE

(71) Applicant: Microsoft Technology Licensing, LLC, Redmond, WA (US)

(72) Inventors: Amit Kumar Dutta, Sammamish, WA (US); Anand Srinivasan, Kirkland, WA (US); Christopher M. Eagan, Seattle, WA (US); Krishnan Ananthanarayanan, Redmond, WA (US); Dhigha Sekaran, Redmond, WA (US); Marius Ungureanu, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 3 days.

This patent is subject to a terminal disclaimer.

(21) Appl. No.: 16/167,214

(22) Filed: Oct. 22, 2018

(65) Prior Publication Data

US 2019/0058743 A1 Feb. 21, 2019

Related U.S. Application Data

(63) Continuation of application No. 15/130,252, filed on Apr. 15, 2016, now Pat. No. 10,142,380.

(51) Int. Cl.
*G06F 15/16* (2006.01)
*H04L 29/06* (2006.01)
*H04N 7/14* (2006.01)
*H04L 12/18* (2006.01)
*H04L 29/12* (2006.01)
(Continued)

(52) U.S. Cl.
CPC ........ *H04L 65/403* (2013.01); *H04L 12/1831* (2013.01); *H04L 61/1594* (2013.01); *H04N 7/147* (2013.01); *G06F 3/0486* (2013.01); *G06F 3/04883* (2013.01); *G06F 2203/04803* (2013.01); *H04M 2203/359* (2013.01)

(58) Field of Classification Search
CPC ............. H04L 12/1831; H04L 61/1594; H04L 65/403; H04M 2203/359
USPC .................................................. 709/203–248
See application file for complete search history.

(56) References Cited

U.S. PATENT DOCUMENTS

8,548,417 B2 * 10/2013 Tucker .................. H04M 3/567
455/344
8,793,306 B2 * 7/2014 Sathyan ............ H04M 1/72525
709/203
9,282,285 B2 * 3/2016 Winterstein ............. H04N 7/15
(Continued)

*Primary Examiner* — Moustafa M Meky
*Assistant Examiner* — Thorne E Waugh
(74) *Attorney, Agent, or Firm* — Workman Nydegger (57) ABSTRACT

A multi-media online conversation in which automatic actions associated with executable components, such as recording and broadcasting, are performed by adding a visualized representation of the action into the online conversation. The action appears as a visualization in a portion of the user interface that includes both individuals that may be joined into a conference as well as one or more executable components. The action associated within an executable component may thus be efficiently performed in a consistent manner with how individuals are added into an online conversation, thereby taking advantage of muscle memory of the participant.

20 Claims, 5 Drawing Sheets

(51) Int. Cl.
*G06F 3/0486* (2013.01)
*G06F 3/0488* (2013.01)

(56) References Cited

U.S. PATENT DOCUMENTS

| | | | |
|---|---|---|---|
| 9,319,824 B2 * | 4/2016 | Sathyan | H04M 1/72525 |
| 10,127,563 B2 * | 11/2018 | Heath | G06Q 30/02 |
| 10,178,350 B2 * | 1/2019 | Mueller | H04N 7/155 |
| 10,217,117 B2 * | 2/2019 | Heath | G06Q 30/02 |
| 10,228,775 B2 * | 3/2019 | Zhou | G06F 3/03545 |
| 2016/0180259 A1 * | 6/2016 | Marianko | G06Q 10/02 |
| | | | 705/5 |

* cited by examiner

Figure 6

JOINING EXECUTABLE COMPONENT TO ONLINE CONFERENCE

CROSS-REFERENCE TO RELATED APPLICATION

This application is a continuation of U.S. patent application Ser. No. 15/130,252, filed on Apr. 15, 2016, and titled "JOINING EXECUTABLE COMPONENT TO ONLINE CONFERENCE," the entire contents of which are incorporated by reference herein in their entirety.

BACKGROUND

Computers and networks have ushered in new opportunities of social networking and collaboration. One form of such network is referred to as an "online conference". Early online conferencing took the form of video conferencing that required dedicated equipment, cameras, and so forth. More recently, online conferencing may be performed on almost any computing system. Applications are now offered by a variety of venders whereby a user can participate in an online conference by viewing video and audio of other participants, sharing collaborative work areas, chatting, and so forth, via a web site.

A typical online conferencing application provides a user interface that includes an online conferencing area, which includes a visualized representation of each participant. A contacts area of the user interface illustrates visualized representations of various individuals that might join into an online conference. Once in an online conference, individuals may communicate using video, audio, and other multi-media mechanisms. The communications that support the conferencing can take the form of Internet Protocol (IP) packets, and thus may be freely communicated over the Internet.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a system that efficiently performs actions (such as recording and/or broadcasting) in an online conversation that involves video and audio and potentially other forms of media as well. In some cases, this performing of actions is performed by taking advantage of the mechanisms a user may already be familiar with, such as adding an individual into an online conference.

The system includes a user interface presented on a display of the system. The user interface shows each of at least some participants in the online conversation that involves at least audio and video. The user interface includes a portion that shows multiple visualizations that each represent entities that may be added into the online conversation. Traditionally, the entities represent individuals that may be added into the online conversation. However, in accordance with the principles described herein, the entities may also be executable components. For instance, the entities may include one or more recording components and/or one or more broadcasting components.

Instructions to add one or more entities associated with one or more of the plurality of contacts to the online conversation are detected. For instance, such instructions may be caused by the user interacting in particular ways with the user interface. In some embodiments, the user interaction may be quite similar regardless of whether the entity being added is an individual or an executable component. Accordingly, a participant may perform actions to record and/or broadcast the online conversation using mechanism already familiar to the participant, allowing for efficient performance of the action.

When an instruction to add an executable component to the online conversation is detected, the action associated with the executable component (such as recording and/or broadcasting) is performed. In some embodiments, after adding an executable component, a visualization of the executable component may appear in the online conversation portion of the user interface, thereby giving everyone notice that the action is being taken.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to a system that efficiently performs actions (such as recording and/or broadcasting) of an online conference that involves video and audio and potentially other forms of media as well. In some cases, this performing of actions is performed by taking advantage of the mechanisms a user may already be familiar with, such as joining an individual into an online conference.

The system includes a user interface presentation component that causes, at least under one circumstance, a user interface to be presented on a display of the system. The user interface includes an online conversation portion that shows each of at least some participants in an online conversation that involves at least audio and video. The user interface further includes a contacts portion that shows multiple contacts that each represent entities that may be joined into the online conversation. Traditionally, the entities represent individuals that may be joined into the online conversation. However, in accordance with the principles described herein, the entities may also be executable components. For instance, the entities may include one or more recording components and/or one or more broadcasting components.

A joining instruction detection component detects instructions to join one or more entities associated with one or more of the plurality of contacts to the online conversation. For instance, such instructions may be caused by the user interacting in particular ways with the user interface. In some embodiments, the user interaction may be quite similar regardless of whether the entity being joined is an individual or an executable component. Accordingly, a participate may perform actions to record and/or broadcast the online conversation using mechanism already familiar to the participant, allowing for efficient performance of the action.

A joining component responds to such instructions by joining an entity within the online conversation. If the entity is an executable component that performs an action, the executable component responds to the joining by performing the associated action (such as recording and/or broadcasting). In some embodiments, after joining an executable component, a visualization of the executable component may appear in the online conversation portion of the user interface, thereby giving everyone notice that the action is being taken.

Some introductory discussion of a computing system will be described with respect to FIG. 1. Then, the system for efficiently triggering actions with respect to an online conversation will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
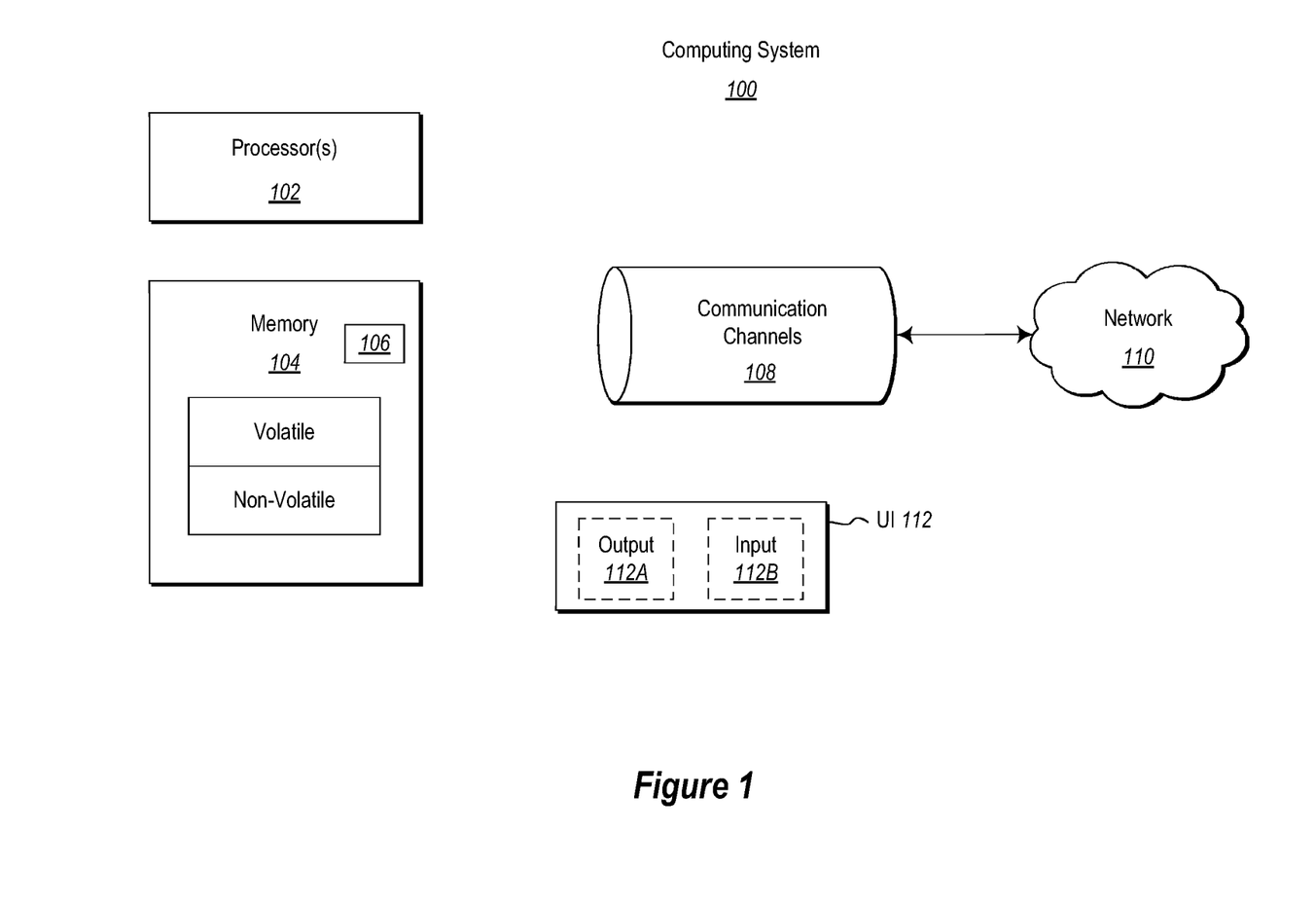
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
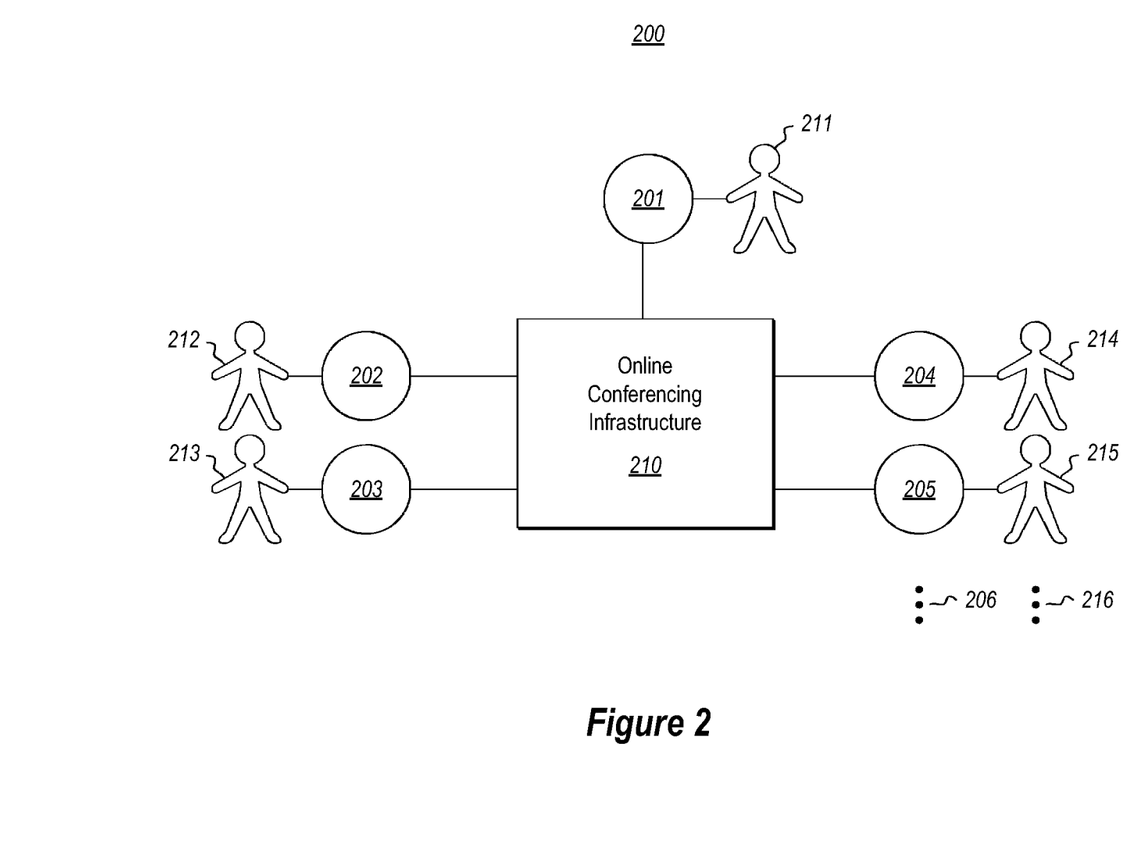
FIG. 2 illustrates an online conferencing environment in which the principles described herein may be employed, which includes multiple participants using corresponding participant computing systems to engage in the online conference using an online conferencing infrastructure.

FIG. 2 illustrates an online conferencing environment 200 in which the principles described herein may be employed. The online conferencing environment 200 includes multiple participant computing systems that participants use to engage in the online conference. The online conference environment 200 also potentially also include an online conferencing infrastructure 210. The online conferencing environment 200 may include dedicated computing systems that facilitate the online conference. For instance, the online conferencing environment 200 may be an online conferencing service that is implemented in a cloud computing environment or is some other remote network. This embodiment will be referred to herein as the "service embodiment".

That said, the principles described herein may also be applied in an environment in which the participant computing systems communicate directly one with another in accordance with a protocol so as to allow the online conferencing to occur. In that case, the online conferencing infrastructure 210 may be thought of as a protocol for each participant computing system communicating with each other, and the underlying hardware (e.g., a network such as the Internet, or a local network) that facilitates communication using that protocol. This embodiment will be referred to herein as the "ad hoc embodiment".

In the example of FIG. 2, there are five participant computing systems 201 through 205 involved in an online conference. However, the ellipses 206 represent that there may be any multiple number of participant computing systems engaged in any given online conference via the online conferencing infrastructure 210. In fact, one of the benefits of online conferencing is that any number of participants may participate, and participants may drop off and join at any time. The participant computing systems 201 through 205 may each be structured as described above for the computing system 100 of FIG. 1, and include user interface systems as described above for the user interface system 112 of FIG. 1. Each of the participant computing systems 201 through 205 have an associated participant user 211 through 215 respectively. The ellipses 216 again represents that there may be further participant users associated with yet other computing systems represented by the ellipses 206.

Figure 3:
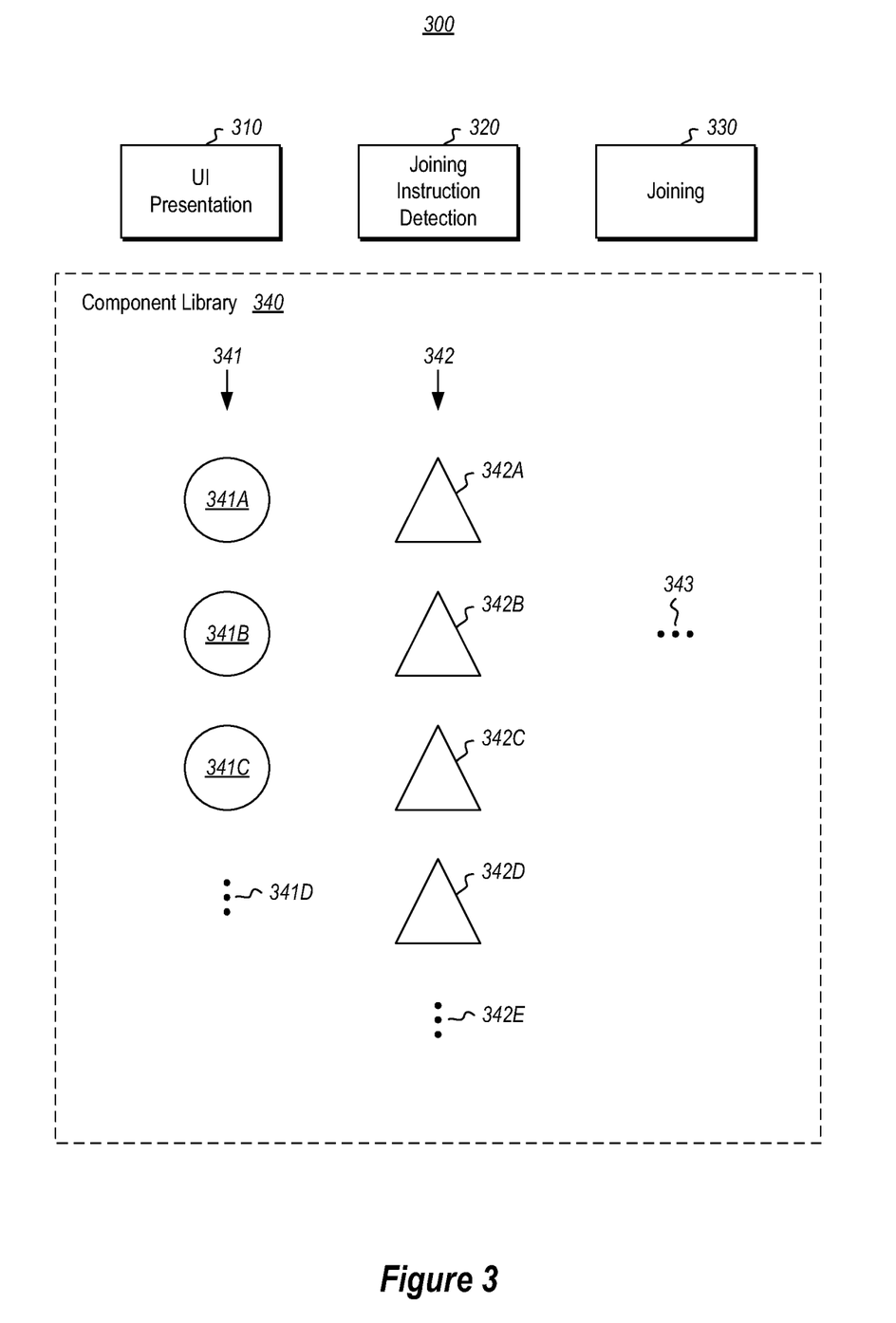
FIG. 3 schematically illustrates an online conferencing system that may operate within the online conferencing environment of FIG. 2, and which includes various executable components including a user interface presentation component, a joining instruction detection component, a joining component, as well as a library of executable components that may be joined into an online conference.

FIG. 3 schematically illustrates an online conferencing system 300 that may operate within the online conferencing environment 200 of FIG. 2. The online conferencing system 300 includes various executable components including a user interface presentation component 310, a joining instruction detection component 320, and a joining component 330. The system 300 also includes a library 340 of executable components that, when executed, perform some operation (such as recording or broadcasting) of the online conference. Each of the components 310, 320 and 330 may be structured as described above for the executable component 106 of FIG. 1.

The library 340 is illustrated as including executable components first type 341 (represented as circles), and of a second type 342 (represented as triangles). However, the ellipses 343 represents that there may be executable components of a single type, or of a variety of types more than two. In one example, the executable components 341 of the first type are recording executable component that, when joined into the online conference, cause at least a portion of the online conference to be recorded. In one example, the executable components of the second type are broadcast components that, when joined into the online conference, broadcast at least a portion of the online conference. Three executable components 341A through 341C of the first type are illustrated, though the ellipses 341D represents that there may be any number (even zero) of the executable components 341 of the first type within the library. Four executable components 342A through 342D of the second type are illustrated, though the ellipses 342E represent that there may be any number (even zero) of the executable components 342 of the second type within the library. Each of the executable components within the library 340 may be structured as described above for the executable component 106 of FIG. 1.

The user interface presentation component 310 causes, at least under one circumstance, a user interface to be presented on a display of the system. For instance, the user interface presentation component 310 may be present on the online conferencing infrastructure 210 or on a participating computing system (e.g., participating computing system 201), or may be distributed between the online conferencing infrastructure 210 and a participating computing system. In the case of the participating computing system being structured as described for the computing system 100 of FIG. 1, the display may be included within, for instance, the user interface system 112 of FIG. 1. The user interface presentation component 310 may be, for instance, a web site.

Figure 4:
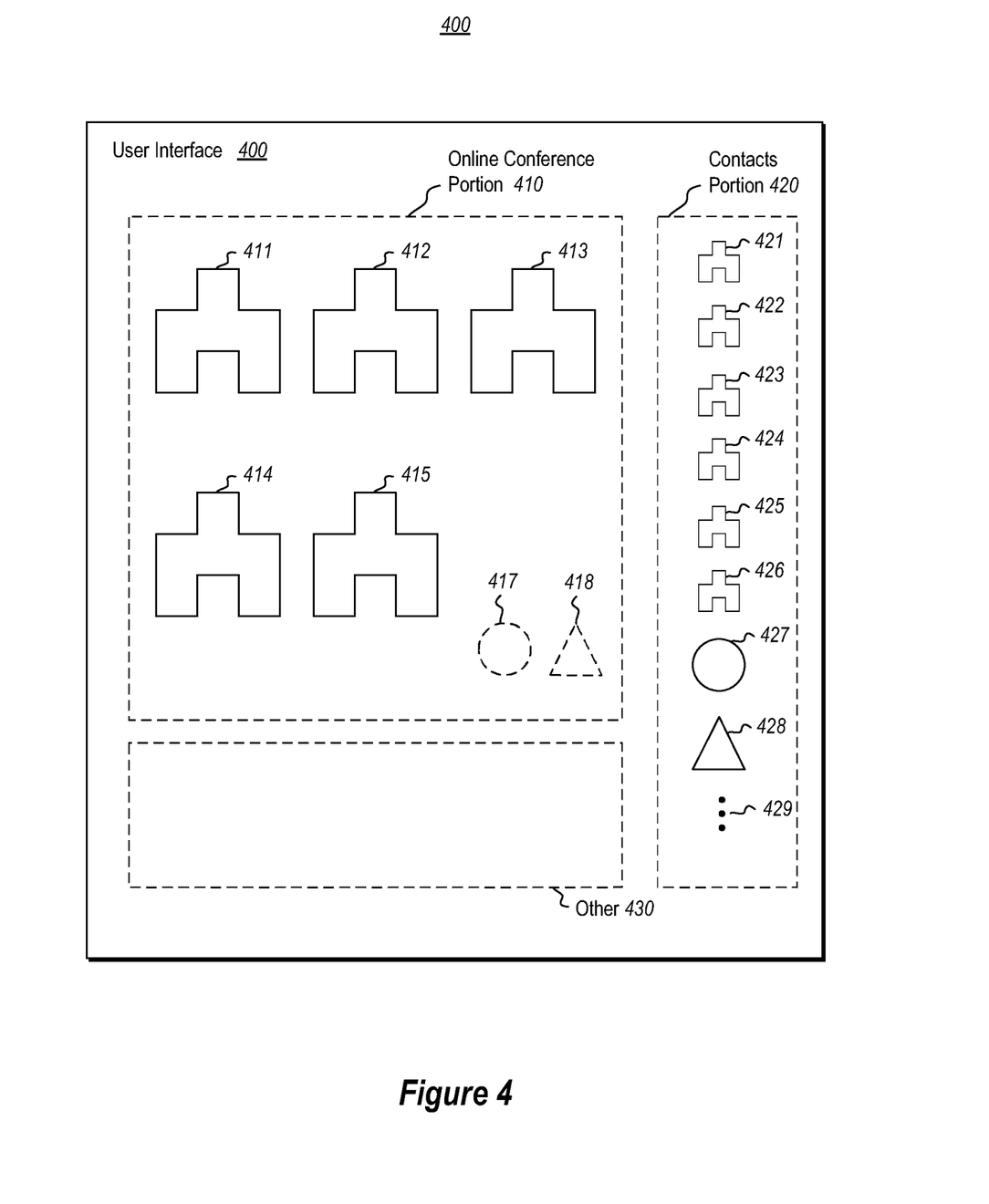
FIG. 4 illustrates an example of the user interface displayed on the display using the user interface presentation component of FIG. 3, and which includes an online conference portion, a contacts portion, and an optional other portion.

FIG. 4 illustrates an example of the user interface 400 displayed on the display. The user interface 400 includes an online conference portion 410, a contacts portion 420, and another portion 430. The precise appearance and locational relationship between these user interface portions is not important to the broader principles described herein. Accordingly, the user interface 400 should be seen as a very specific example only. Furthermore, the other portion 430 is an optional portion that simply represents that the principles described herein are not limited to user interface that only include an online conference portion and a contacts portion. As an example, the other portion 430 might include a chat window, whereby text may be dispatched from a participant to one or more or all of the other participants in the online conference. The other portion 430 might also include controls, such as mute, volume, pause, fast forward, and so forth.

The user interface 400 includes an online conference portion 410 that shows each of at least some of the participants in the online conference. For instance, the online conference illustrates visualizations 411 through 415 that correspond to the participants 211 through 215 (see FIG. 2) of the online conference. In some embodiments, a picture of the participant may be displayed as the visualization. Alternatively, or in addition, a live video feed may be displayed as the visualization. In yet other embodiments, perhaps just a generic image is displayed to represent the participant accompanied by perhaps a text identification of the participant.

The user interface 400 also includes a contacts portion 420 that shows multiple contacts that represents entities that may be joined into the online conversation. In the illustrated embodiment, eight contacts 421 through 428 are illustrated, though the ellipses 429 represents that the contacts potion 420 may include any number of contacts. Some of the contacts represent individuals, while some represent executable components. For instance, suppose in this example, that contacts 421 through 426 represents individuals that can actually participate in the online conference. However, the contacts 427 and 428 represent executable components that are not human at all but perform some action (such as recording or broadcasting) when joined into the online conference.

Referring back to FIG. 3, the online conferencing system 300 includes a joining instruction detection component 320. The joining instruction detection component 320 detects instructions to join one or more entities represented by the contacts to the online conference. This instruction may be caused by, for instance, user interaction with the user interface (e.g., user interface 400) presented by the user interface presentation component 310. In some embodiments, the user interaction that would cause an individual to join the online conference is similar or the same as the user interaction that would cause an executable component to join the online conference and perform its automated action on the online conference. This allows the action to be performed efficiently with respect to the online conference.

A joining component 330 joins an entity within the online conversation when the joining instruction component 320 detects an instruction to join the entity to the online conversation. In some embodiments, when the entity is joined into the online conference, the online conference portion 410 of the user interface 400 is updated to show a visualization of the added entity. For instance, if the added entity were a participant, a visualization of the new participant would be shown in the online conference portion 410 of the user interface 400. If an executable component is added to the online conference, then some visualization would appear providing notice to the participants that the action performed by the executable component (e.g., recording and/or broadcasting) is occurring on the online conference. For instance, if the recording component 427 was dropped into the online conference portion 410, icon 417 might be highlighted. Similarly, if the broadcast component 428 was dropped into the online conference portion 410, icon 418 might be highlighted.

In some embodiments, the user interaction that triggers joining of an executable component to the online conference is a gesture. The gesture includes a selection gesture as well as a joining gesture. The selection gesture selects a contact corresponding to the executable component in the contacts portion 420 of the user interface. A joining gesture represents that the entity associated with the selected contact is to be joined into the online conference. As an example, the selection gesture may comprise selecting the contact in preparation for movement, and the joining gesture would be dragging at least a copy of the selected contact into the online conference portion 410 of the user interface.

This same drag and drop gesture may be the same that the user might perform if selecting and dragging a contact for an individual in order to add that individual as a participant in the online conference. Thus, the consistency of the selection and/or joining gestures allows for more efficient and intuitive performance of an action (such as recording or broadcasting) with respect to an online conference. The net result is that there is more refined control over performing technical actions on the online conference.

As previously mentioned, there may be multiple executable entities of a particular type that may perform an action on an online conference. Each of the executable entities of that particular type may perform the action in a distinct way. For instance, if there are a variety of recording components available, one might record the online conference in a default way. Another recording component might apply augmented reality to the recorded audio and/or video of the online conference. For instance, by quantizing the video, exaggerating features, and/or smoothing edges, the recorded video may be made more like a cartoon. Another recording component may mask out the faces of the participants in the video and/or scramble the frequencies of the audio for anonymity. Yet another recording component may annotate the video with for instance, chat content (with perhaps animation showing the flow of the chat from the participants involved with the chat, text identifying each user, and so forth). Other recording components may add objects into the recording that were not in the original record or may emphasize objects that are in the recording (e.g., the speaker's head may be made bigger to emphasize that the speaker is presently talking). Levels of customization of the record may also differ by recording component.

Similarly, multiple broadcast components may be made available, each performing broadcast in a different way. For instance, the channel for broadcasting (via a cloud service, web page publication, link distribution and the like) may be different by each broadcast component. The audience may be different by each broadcast component. Types of augmented reality imposed on the multimedia stream may be different by each broadcast component. Levels of customization of the broadcast may also differ by broadcast component.

Figure 5:
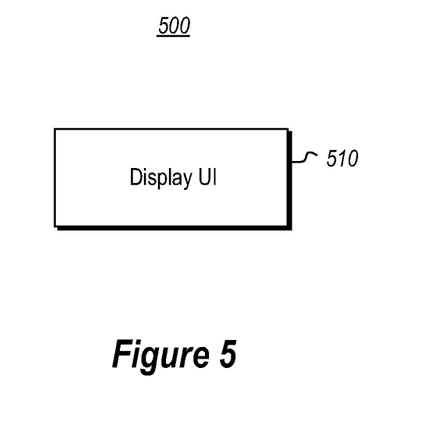
FIG. 5 illustrates a flowchart of a method for preparing for performing an online conversation in accordance with the principles described herein.

FIG. 5 illustrates a flowchart of a method for preparing for performing an online conversation in accordance with the principles described herein. Much of the method 500 has already been described implicitly from the above. However, the method 500 will now be expressly described.

First, a user interface presentation component causes a user interface to be displayed on a display of a system (act 510). For instance, in the above description, the user interface presentation component 310 of FIG. 3 caused a user interface 400 of FIG. 4 to be displayed. Recall the user interface had 1) an online conversation portion that shows each of at least some participants in an online conversation that involves at least audio and video, and 2) a contacts portion that shows a plurality of contacts that represents entities that may be joined into the online conversation. Recall also that the entities include individuals as well as at least one executable component.

Figure 6:
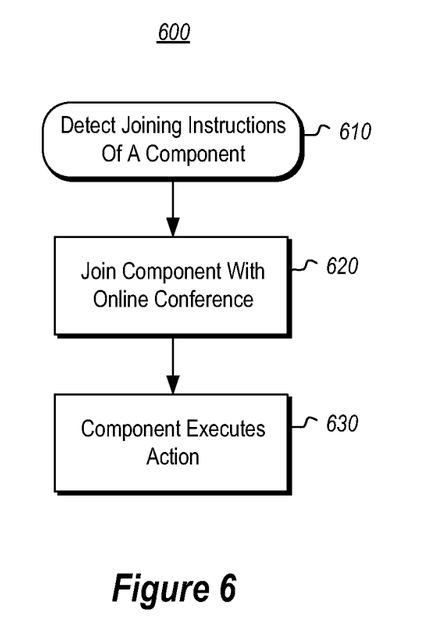
FIG. 6 illustrates a flowchart of a method for joining entities into an online conversation in accordance with the principles described herein.

FIG. 6 illustrates a flowchart of a method 600 for joining entities into an online conversation in accordance with the principles described herein. Much of the method 600 has already been described implicitly from the above. However, the method 600 will now be expressly described. The method 600 uses the preparation performed in the method 500 of FIG. 5 and is triggered by an event in the form of detection of a joining instruction to join an executable component into the online conference (act 610). Recall that the executable component is associated with a contact in the contacts portion of the user interface, and that the instruction has been caused by user interaction with the user interface. As described above, the joining instruction detection component 320 performs this instruction detection.

In response to the instruction, a joining component joins the selected executable component within the online conversation (act 620). This likewise causes the executable component to respond to the joining by causing an action to occur with respect to the online conversation (act 630). As described above, this action could be recording the online conversation in a particular way, broadcasting the online conference in a particular way, or performing some other action with respect to the online conference.

Accordingly, the principles described herein provide an efficient mechanism to perform automated actions on an online conference. Such actions could include, for instance, recording the online conference, broadcasting the online conference, or performing any other actions with respect to the online conference. Furthermore, the performing of such actions may be performed using gestures similar to or identical to those gestures that would normally be performed in order to add a participant to the online conference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   a one or more processors; and
   one or more computer-readable media having stored thereon computer-executable instructions that are executable by the one or more processors to generate a user interface, the user interface comprising at least:
      a first user interface portion that displays a separate visualization for each of a plurality of participants in an online conversation; and a second user interface portion that is visually separated from the first user interface portion, and that concurrently includes separate visualizations for each of one or more individuals and each of one or more executable components that can each be added to the online conversation as participants, the computer-executable instructions also being executable by the one or more processors to add participants into the online conversation, including:
adding a particular executable component to the online conversation as a participant; and
based at least on adding the particular executable component, causing an action, which is defined by executable code of the particular executable component, to be performed within the online conversation.

2. The computing system in accordance with claim 1, wherein the action comprises recording at least a portion of the online conversation.

3. The computing system in accordance with claim 1, wherein the action comprises broadcasting at least a portion of the online conversation.

4. The computing system in accordance with claim 1, wherein adding participants into the online conversation further comprises:
detecting a selection gesture that selects an individual or an executable component from the second user interface portion; and
detecting an adding gesture that represents that the selected individual or executable component is to be added to the online conversation.

5. The computing system in accordance with claim 4, wherein the adding gesture comprises a drag and drop operation.

6. The computing system in accordance with claim 4, wherein the selection gesture is the same when selecting an individual or an executable component.

7. The computing system in accordance with claim 6, wherein the joining gesture is the same when selecting an individual or an executable component.

8. The computing system in accordance with claim 4, wherein the joining gesture is the same when selecting an individual or an executable component.

9. The computing system in accordance with claim 1, wherein at least some of the one or more executable components are configured to perform a distinct corresponding action when added into the online conversation.

10. The computing system in accordance with claim 9, wherein the distinct corresponding action comprises recording the online conversation in a distinct way.

11. The computing system in accordance with claim 10, wherein the distinct way comprises applying augmented reality to the audio or video of the online conversation.

12. The computing system in accordance with claim 10, wherein the distinct way comprises altering the video.

13. The computing system in accordance with claim 12, wherein the altering of the video comprises annotating the video.

14. The computing system in accordance with claim 10, wherein the distinct way comprises altering of the audio.

15. The system in accordance with claim 9, wherein the plurality of executable components comprises a plurality of broadcast components that are each configured to broadcast the online conversation in a distinct way.

16. A method for joining executable components into an online conversation, the method comprising:
generating a user interface comprising at least:
a first user interface portion that displays a separate visualization for each of a plurality of participants in the online conversation; and
a second user interface portion that is visually separated from the first user interface portion, and that concurrently includes separate visualizations for each of one or more individuals and each of one or more executable components that can each be added to the online conversation as participants; and
adding participants into the online conversation, including:
adding a particular executable component to the online conversation as a participant; and
based at least on adding the particular executable component, causing an action, which is defined by executable code of the particular executable component, to be performed within the online conversation.

17. The method in accordance with claim 16, wherein the action comprises recording at least a portion of the online conversation.

18. The method in accordance with claim 16, wherein the action comprises broadcasting at least a portion of the online conversation.

19. The method in accordance with claim 16, the method further comprising:
detecting a selection gesture that selects an individual or an executable component from the second user interface portion; and
detecting an adding gesture that represents that the selected individual or executable component is to be added to the online conversation.

20. A computer program product comprising one or more hardware storage devices having stored thereon computer-executable instructions that are structured such that, when executed by one or more processors of a computing system, the computer-executable instructions cause the computing system to at least:
generate a user interface comprising at least:
a first user interface portion that displays a separate visualization for each of a plurality of participants in an online conversation; and
a second user interface portion that is visually separated from the first user interface portion, and that concurrently includes separate visualizations for each of one or more individuals and each of one or more executable components that can each be added to the online conversation as participants; and
add participants into the online conversation, including at least:
detect an add gesture, the add gesture representing that an individual or executable component from the second user interface portion is to be added to the online conversation;
based on detecting the add gesture, adding a particular executable component to the online conversation as a participant; and
based at least on adding the particular executable component, causing an action, that is defined by executable code of the particular executable component, to be performed within the online conversation.

* * * * *